Oct. 12, 1943.　　　C. E. HATHORN　　　2,331,608
SCREW AND METHOD OF MAKING SAME
Filed May 28, 1942　　　3 Sheets-Sheet 1

INVENTOR
CHARLES E. HATHORN.
BY
ATTORNEY

Oct. 12, 1943.                C. E. HATHORN                2,331,608
              SCREW AND METHOD OF MAKING SAME
                  Filed May 28, 1942        3 Sheets-Sheet 2

INVENTOR
CHARLES E. HATHORN.
BY
ATTORNEY

Oct. 12, 1943.  C. E. HATHORN  2,331,608
SCREW AND METHOD OF MAKING SAME
Filed May 28, 1942   3 Sheets-Sheet 3
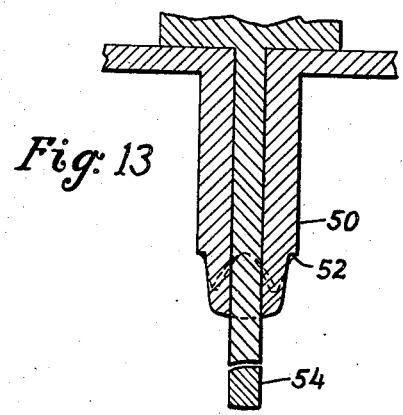
Fig. 13
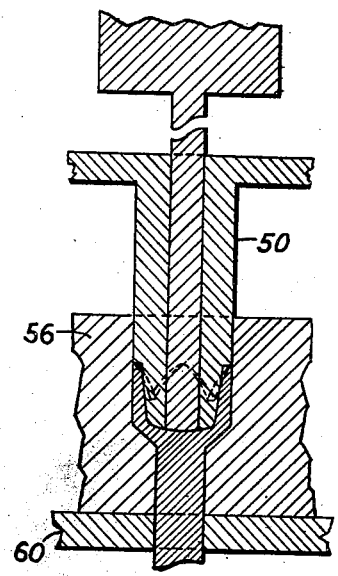
Fig. 14
Fig. 15
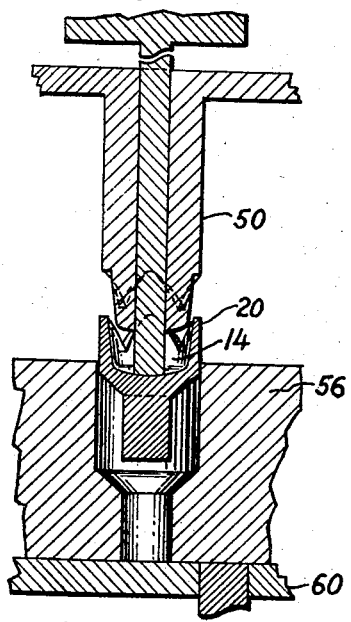
Fig. 16
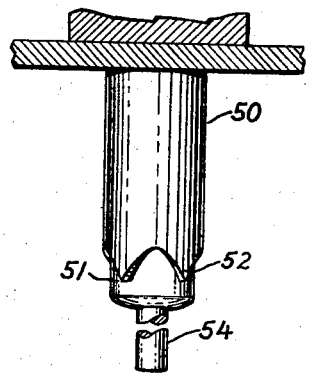
Fig. 12
INVENTOR
CHARLES E. HATHORN
BY
ATTORNEY Patented Oct. 12, 1943

2,331,608

UNITED STATES PATENT OFFICE 2,331,608

SCREW AND METHOD OF MAKING SAME

Charles E. Hathorn, Kenmore, N. Y., assignor to Curtiss-Wright Corporation, a corporation of Delaware Application May 28, 1942, Serial No. 444,785

13 Claims. (Cl. 10—10)

This invention is directed to new and useful improvements in screw heads and the method of making same. Specifically, the invention is directed to that type of screw in which the head is formed with a cross or other shaped opening or recess which does not extend all the way across the head.

In the past, such openings or recesses have been formed in screw heads largely by means of punching operations, with the result that the recess tapers inwardly within the head. As a result of such a construction, there is always a tendency for the screw driver to slip out of the recessed head. Consequently, it is an object of this invention to provide an opening or recess in a screw head in which the walls thereof are not tapered but instead are parallel to the axis of the screw.

Another disadvantage of a screw head formed by punching the recess therein is that any slight eccentricity of the punch relative to the screw axis results in a very thin wall on one side of the head. In addition, in order to prevent the screw driver from slipping out of the tapered recess, it is necessary to make the recess quite deep. Both of these disadvantages tend to result in splitting of the screw head. Therefore, another object of this invention is to provide a new and improved method of forming a relatively shallow recess in a screw head with non-tapered walls.

A further object of the invention is to provide a new type screw head and method of making same in which the screw driver receiving opening is made by first forming a substantially cylindrically recessed head, for example, by machining or extrusion operations with the edge of the recessed wall scalloped or notched to form axially extending prongs or projections, then causing these projections and a portion of the side wall of the recess to be bent inwardly to form the face of the screw head. The resulting position of the projections form axially extending openings into the head for the reception of a correspondingly shaped screw driver.

Other objects will appear as the invention is more fully described in the following specification.

Figure 7:
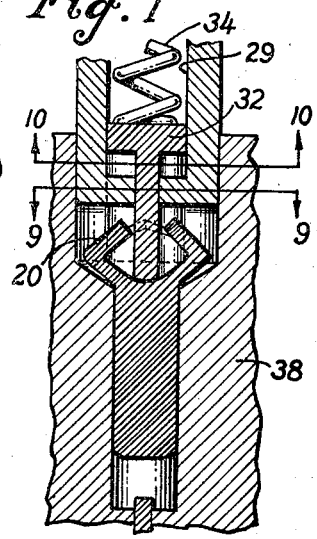
Figure 6:
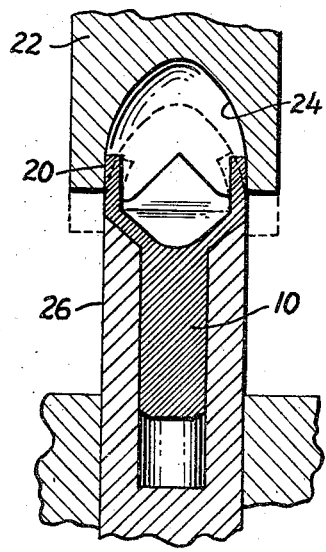
Fig. 6 is a sectional view showing a die for performing a preliminary operation on the head.
Figure 9:
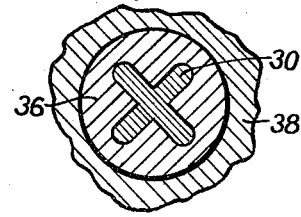
Figure 11:
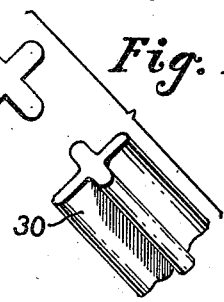
Figure 10:
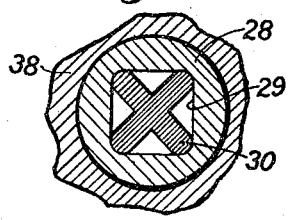

Figs. 9 and 10 are sectional views taken along the lines 9—9 and 10—10 respectively, of Fig. 7;

Fig. 11 is a partial perspective view and a plan view of the die core;

Fig. 12 is a plan view, partly in section, of a die for extruding the screw head; and Figs. 13 to 16 illustrate various steps in the extrusion of the screw head.

Referring now to the drawings, 10 and 11 indicate screws with heads 12 and 13 made in accordance with the present invention. Said heads each have a recess 14 with axial openings 18 extending from a face 16 of the screw head into the recess 14. It is to be understood that the invention is equally applicable to all kinds of screws, bolts, or other similar securing means and that the term "screw" as herein used, is to be considered generic to all such securing means.

Figure 1:
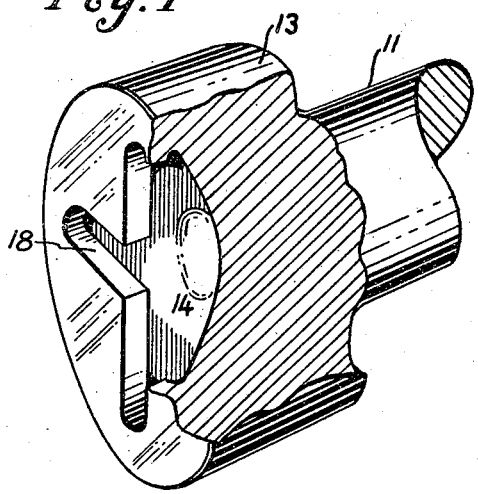
Figs. 1 and 2 are perspective views, partly in section, showing heads of different screws formed according to the invention.
Figure 2:
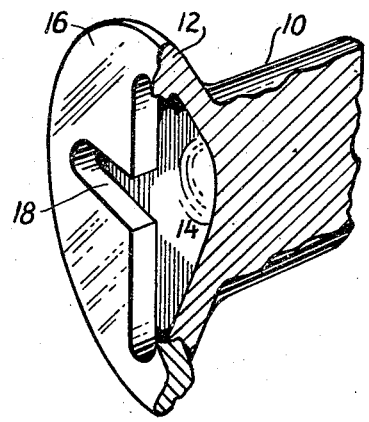
Figure 3:
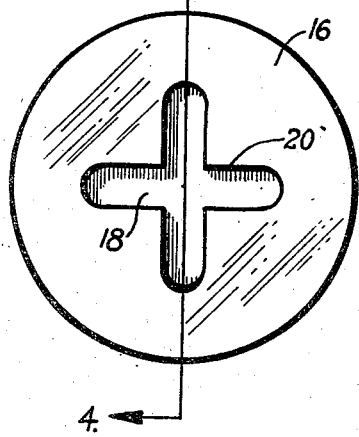
Fig. 3 is a plan view of the screw head illustrated in Fig. 2.
Figure 4:
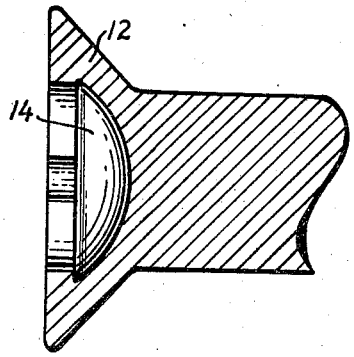
Fig. 4 is a section taken along the line 4—4 of Fig. 3.
Figure 5:
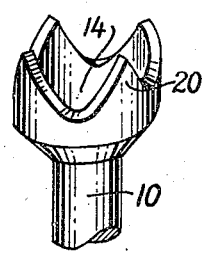
Fig. 5 is a perspective view of a screw blank before the face of the head has been formed.
Figure 8:
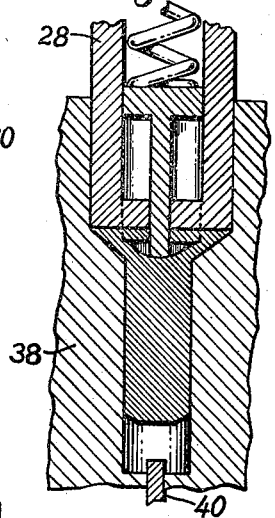
Figs. 7 and 8 are sectional views showing a die for final forming of the screw head before and after operation.

Fig. 5 illustrates the screw blank before the face of the screw head has been formed. This screw head may be formed by extrusion, as hereinafter described, or the head may be formed by some other method, for example, by upsetting one end of the screw blank and then machining the upset head end to form a substantially cylindrical recess 14 in the head with the upper edge of the wall of said recess notched or scalloped to form axially extending projections or prongs 20. The screw blank is then placed in a holding block 26, and a die 22 having a hollow concave face 24 is operated to impart a preliminary inward bend to the prongs 20 and to the side wall of the recess. The screw blank is then placed in a second holding block 38 having a core 30 of cross-shaped cross section and extending between the preliminary bent prongs 20 of the screw head. A spring 34 engages a non-circular head 32 of the core 30 to bias the core against the base of the recess 14. The non-circular head 32 of the core is slidably but non-rotatably received within the hollow 29 of die 28 and the cross-shaped portion of the core extends through a correspondingly shaped opening in the head end 36 of the die 28. Upon application of pressure to the die, the prongs 20 and side wall of the recess are bent radially inward to the position shown in Fig. 8, and the core 30 operates to maintain an axial opening through the face of the head between the inwardly bent prongs 20. The side wall of this opening is non-tapering and extends in a direction parallel to the screw axis. An ejector 40 is provided to remove the screw blank from the holding block 38 after the head has been formed.

As illustrated, the screw head is provided with a cross-shaped opening. This is the usual shape of opening provided in such screws. However, it is to be understood that the invention is not so limited. Obviously, by changing the number, shape or character of the axial prongs 20 and by providing the die 28 and core 30 to correspond, openings of various cross section and shape may be formed in the screw head.

Figs. 12 to 15 illustrate a method of forming a screw head blank of the type illustrated in Fig. 5 by an extrusion process. A punch 50 is provided with a substantially cylindrical portion 51 and a scalloped edge portion 52 corresponding to the desired shape of prongs or projections 20. The cylindrical portion 51 is slightly tapered to permit its removal from the recess 14 formed thereby. A screw blank 15 is placed in a holder 56 having a cylindrical recess 58 into which the blank extends. The cylindrical portion 51 of the punch is of smaller diameter than the recess 58 while the body of the punch 50 is snugly received within the recess 58. Thus, upon application of pressure to the punch 50, the metal of the screw blank is extruded between portion 51 of the punch and the wall of the recess 58, the edge portion 52 of the punch operating to form the prongs or projections 20 extending from the screw head. An ejector 54 extends through the center of the punch in order to remove the screw blank. A shearing member 60 operates to cut the screw blank to the proper length. The blank thus formed corresponds to that illustrated in Fig. 5.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. A screw or the like provided with a head, the face of the head comprising a continuous inturned flange with one or more axially extending openings between portions of the flange.

2. A screw or the like provided with a head, the face of the head comprising an inturned flange with one or more axially extending through openings.

3. A screw or the like as recited in claim 2 in which said opening or openings have axial non-tapering side walls.

4. A screw or the like provided with a head, the face of the head comprising an inturned flange with one or more openings between edges of the flange and extending into the head, the walls of said openings extending in an axial direction.

5. A screw or the like formed from a blank having a cylindrically recessed head with the wall of the recess bent radially inward to form the face of the head, said face having one or more through openings with axial non-tapering side walls.

6. A screw or the like provided with a head, the face of the head comprising an inturned flange with radially extending projections, the spaces between said projections defining one or more axial openings extending inward from the face of the head.

7. A screw or the like as recited in claim 5 in which said opening or openings have axial non-tapering side walls.

8. The method of forming the head of a screw or the like comprising the step of providing a head on a screw blank with an axially extending cylindrical recess having a notched or scalloped edge forming axially extending projections, and the step of causing said projections and the side wall of the recess to be bent radially inward to form the face of the screw head with one or more axial openings between the edges of said projections.

9. The method of forming the head of a screw or the like comprising the step of providing a head with an axially extending cylindrical recess having a notched or scalloped edge forming axially extending projections, and the step of causing said projections to be bent radially inward to form the face of the screw head with one or more axial openings between the edges of the projections.

10. The method of forming the head of a screw or the like comprising the steps of providing a head with an axially extending cylindrical recess having a notched or scalloped edge forming axially extending projections, of causing the projections to be preliminarily bent inward a slight amount, and of placing a core between said projections and causing the projections to be bent radially inward about said core to form the face of the screw head with one or more openings between said projections as formed by the core.

11. The method of forming the head of a screw or the like comprising the steps of providing a head with an axially extending cylindrical recess having a notched or scalloped edge forming axially extending projections, and of causing said projections to be bent radially inward about a core member shaped to correspond to the number and shape of said projections whereby one or more axial openings are left by the core between said projections.

12. The method of forming the head of a screw or the like comprising the steps of providing a head with an axially extending cylindrical recess, and of causing the side walls of said recess to be bent radially inward so as to leave one or more axial openings therebetween.

13. The method of forming a head screw blank or the like comprising the step of extruding a portion of one end of the blank into a hollow cylindrical portion with the edge of the cylindrical portion notched or scalloped to form axially extending projections, and causing said projections to be bent radially inwardly to form the face of the screw head with one or more axial openings between the edges of said projections.

CHARLES E. HATHORN.